Aug. 7, 1945.   F. R. MAXWELL   2,381,680
AIRPLANE AND CONTROL DEVICE THEREFOR
Original Filed Nov. 12, 1940
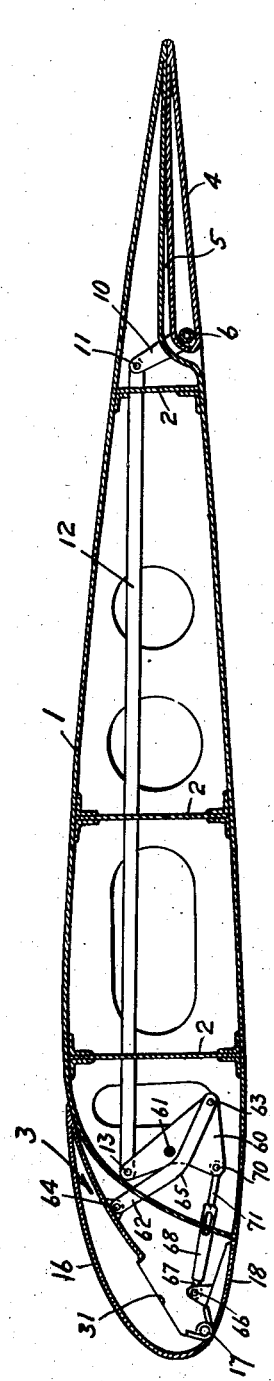
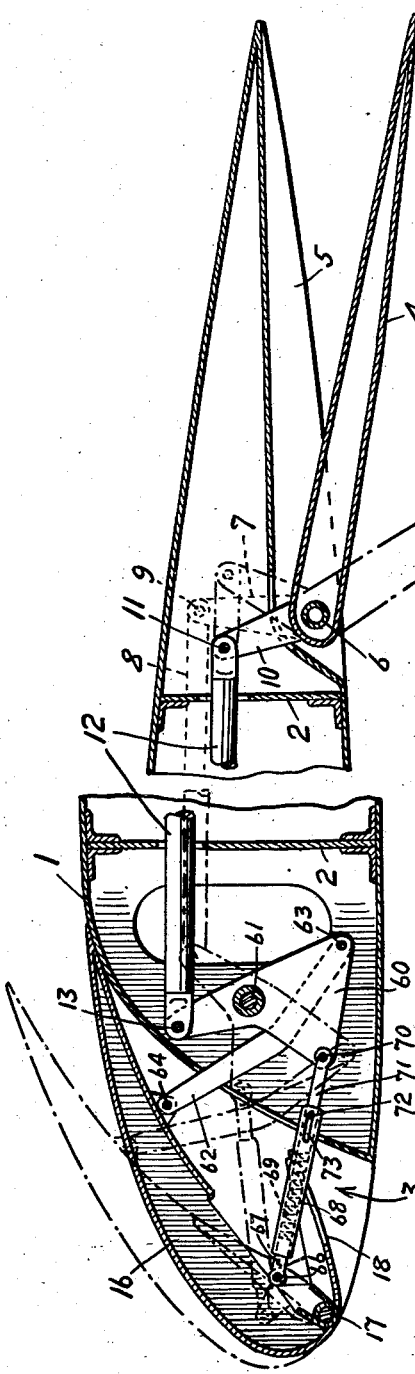
WITNESS:
INVENTOR
Frank R. Maxwell
BY
ATTORNEYS Patented Aug. 7, 1945

2,381,680

UNITED STATES PATENT OFFICE 2,381,680

AIRPLANE AND CONTROL DEVICE THEREFOR

Frank R. Maxwell, Rose Valley, Pa.

Original application November 12, 1940, Serial No. 365,347. Divided and this application March 17, 1943, Serial No. 479,434

3 Claims. (Cl. 244—42)

My present invention relates to airplanes and more particularly has reference to an airplane wing having a novel slot and flap so interconnected that the opening movement of the slot is under positive control of the pilot at all times. More specifically, the slot is locked in its closed position against aerodynamic forces acting on the nose of the wing until the pilot moves the flap.

Numerous control devices have heretofore been incorporated in airplane wings to permit a high speed in flight and at the same time enable low speed takeoffs and permit the airplane to land in relatively small areas.

An object of this invention is to provide an airplane wing having a slot which extends through the wing adjacent to the leading edge thereof with covers for the upper and lower openings of said slot, said covers in their closed position conforming to the upper and lower contours of the wing and means to move the lower cover into contact with the upper cover to give an airfoil section to the upper cover upon initial movement of the upper cover and to maintain this airfoil section during all further movement of the upper cover, thereby affording optimum airflow through the slot.

Yet another object of this invention is to provide a novel nose slot for an airplane wing in which the upper and lower openings of the slot are closed by covers and in which the lower cover can open sufficiently to afford a smooth contour in the slot when the upper cover is partially opened and to thereafter remain in such position so that the contour of the slot will remain smooth as the upper cover is opened further.

And a still further object of this invention is to provide a slot for an airplane wing in which the upper and lower openings of the slot are closed by cover members, the upper cover member being pivoted to the nose of the wing and the lower cover member being hinged to the upper cover member.

To achieve the foregoing and other objects, this invention comprises providing a slot adjacent to the leading edge of the wing and a flap near the trailing edge of the wing. The upper and lower openings of the slot are adapted to be closed by covers which conform to the contour of the upper and lower surfaces of the wing in their closed position. Linkage connects the flap to the upper cover and there is a connection to the lower cover which is operated by movement of the linkage. A control extends from the operating linkage to the cockpit or the fuselage of the airplane so that the pilot may actuate the slot and flap by a single control.

The linkage is of such nature that the flap may move through a small angle before the slot opens and the aerodynamic forces working on the leading edge of the wing cannot open the upper cover until the pilot has moved the flap. Furthermore, the connection to the lower cover will permit the lower cover to move into contact with the upper cover to give an airfoil section to the upper cover upon the initial movement of the upper cover and will maintain this airfoil section for all further movement of the upper cover, thus permitting maximum airflow through the slot.

In the drawing:

Figure 1 is a transverse sectional view of a form of my novel nose slot and flap combination.

Figure 2 is a fragmental transverse sectional view of the construction shown in Figure 1 illustrating the different movements of the slot covers.

Referring to Figures 1 and 2 I have shown an airplane wing 1 of any suitable construction having internal spars 2, a slot 3 which extends through the wing adjacent to the leading edge thereof and a flap 4 provided near the trailing edge of the wing. The wing 1 is formed with a recess or well 5 in which the flap 4 is pivoted as shown at 6. An arm 7 is attached to the flap and an operating rod 8 is pivoted to the free end of the arm 7 as indicated at 9. The rod 8 is suitably connected to the flap operating mechanism (not illustrated) located within the cockpit or fuselage of the airplane.

There is also attached to the flap 4 a short arm 10 to which is pivoted at 11 a long operating link or push rod 12. As clearly shown in Figure 1, the operating rod 12 extends to a point adjacent to the slot 3 and is pivoted at 13 to one arm of a lever 60 which is pivoted at 61 to the internal structure of the wing.

The upper opening of the slot 3 is adapted to be closed by a cover 16 which is hinged to the nose of the wing 1, as shown at 17. A second slot cover 18 for the lower opening of the slot is also hinged at the point 17. As clearly shown in the drawings, when the covers 16 and 18 are in their closed positions, they conform to the contour of the upper and lower surfaces of the wing 1, thereby affording an airfoil section.

A push rod 62 is pivoted to the lever 60 as shown at 63, and to the upper slot cover as shown at 64. The rod 62 is curved as indicated at 65 so that it will not interfere with the pivot point 61 of the lever 60.

Pivoted to the lower slot cover 18 as shown at 66 is a short rod 67. Secured to the end of the rod 67 is a sleeve 68 in which is disposed a helical spring 69. Pivoted at 70 to the lever 60 is a rod 71 which extends into the sleeve 68. A pin 72 provided on the rod 71 projects through a lost motion slot 73 provided in the sleeve 68. It is thought obvious therefore that when the lever 60 is moved about its pivot 61 by the lowering of the flap 4, the rod 71 will slide in the sleeve 68, compressing the spring 69, thereby causing the lower slot cover 18 to move into well or recess 31 as shown in broken lines in Figure 2 on initial movement of the upper cover whereby a smooth contour is provided in the slot 3.

It should be further observed that the pivot points 13, 61 and 63 are in a substantially straight line when the slot 3 and the flap 4 are in their closed positions. As a result, it is not possible for the upper slot cover 16 to be opened by virtue of the forces acting on the wing 1.

From the foregoing description, it will be appreciated that the slot is provided with upper and lower covers having means to move the lower cover into contact with the upper cover to give an airfoil section to the upper cover upon initial movement of the upper cover and to maintain this airfoil section during all further movement of the upper cover. In addition, the upper cover under certain circumstances may be pivoted to the nose of the wing and the lower cover may be hinged to the upper cover. The linkage connecting the slot and flap may be provided with a locking device to prevent the aerodynamic forces acting on the wing from opening the slot until the flap begins to move.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

This application is a division of application filed by me November 12, 1940, Serial No. 365,347, now Patent No. 2,321,837, granted June 15, 1943.

What I claim and desire to protect by Letters Patent is:

1. An airplane wing having a slot adjacent its leading edge extending transversely to the line of flight, an upper cover for the slot pivotally supported from the wing, a lower cover for the slot, and interconnected members forming operative connections between said covers whereby they may be rendered cooperatively operative, said operative connections between the upper and lower slot covers comprising means whereby the lower cover will be initially moved toward its open position before initial effective opening movement of the upper cover and whereby the lower cover will remain in fully opened position throughout the range of effective opening of the upper cover.

2. An airplane wing having a slot adjacent its leading edge extending transversely to the line of flight, an upper cover for the slot pivotally supported from the wing, a lower cover for the slot, and interconnected members forming operative connections between said covers whereby they may be rendered cooperatively operative, said operative connections between the upper and lower slot covers comprising means permitting lost motion whereby the lower cover will be initially moved toward its position before initial effective opening movement of the upper cover and whereby the lower cover will remain in fully opened position throughout the range of effective opening of the upper cover.

3. An airplane wing having a slot adjacent its leading edge extending transversely to the line of flight, an upper cover for the slot pivotally supported from the wing, a lower cover for the slot, hinged to the upper cover, and interconnected members forming operative connections between said covers whereby they may be rendered cooperatively operative, said operative connections between the upper and lower slot covers comprising means whereby the lower cover will be initially moved toward its open position before initial effective opening movement of the upper cover and whereby the lower cover will remain in fully opened position throughout the range of effective opening of the upper cover.

FRANK R. MAXWELL.